United States Patent [19]

Gonsalves et al.

[11] Patent Number: 5,399,874
[45] Date of Patent: Mar. 21, 1995

[54] CURRENCY PAPER VERIFICATION AND DENOMINATION DEVICE HAVING A CLEAR IMAGE AND A BLURRED IMAGE

[76] Inventors: Robert A. Gonsalves, 16 Lexington St., Woburn, Mass. 01801; Richard A. Menelly, 87 Borden Rd., Burlington, Conn. 06013

[21] Appl. No.: 182,462
[22] Filed: Jan. 18, 1994
[51] Int. Cl.⁶ .............................................. G06K 5/00
[52] U.S. Cl. ........................................ 250/556; 382/7
[58] Field of Search .................... 250/556, 557, 559; 356/71; 382/7, 9, 5, 8, 54; 209/534

[56] References Cited

U.S. PATENT DOCUMENTS

| | | |
|---|---|---|
| 4,309,602 | 1/1982 | Gonsalves et al. |
| 4,435,834 | 3/1984 | Pauli et al. ............ 250/556 |
| 4,524,276 | 6/1985 | Ohtombe. |
| 4,652,015 | 3/1987 | Crane. |
| 4,761,205 | 8/1989 | Crane. |
| 4,837,840 | 6/1989 | Goldman ............ 382/7 |
| 4,980,569 | 12/1990 | Crane et al. |
| 5,151,607 | 9/1992 | Crane et al. |
| 5,210,398 | 5/1993 | Metlitsky. |
| 5,260,582 | 11/1993 | Danek et al. |
| 5,308,992 | 5/1994 | Crane et al. ............ 250/556 |

OTHER PUBLICATIONS

"Phase Retrieval and Diversity in Adaptive Optics" Robt. Gonsalves Optical Engineering 1982 vol. 21 No. 5.

*Primary Examiner*—David C. Nelms
*Assistant Examiner*—Que T. Le

[57] ABSTRACT

A linear array of photodiode and phototransistor pairs are positioned on opposite sides of currency paper for denomination determination under reflected light and for verification determination under transmitted light. The focus of one of the photodiodes in each pair is precisely adjusted for the top surface of the currency paper. The focus of the other photodiode in each pair is slightly out of focus at the top surface. A phase diversity algorithm integrates the successive images from both photodiodes to form a clear image. A processor determines the presence or absence of the security feature and correspondingly provides visual or audible indication thereof. The processor contains stored information identifying currency denomination and a comparison is made at the time of verification to also determine the denomination of the proffered currency.

18 Claims, 3 Drawing Sheets

CURRENCY PAPER VERIFICATION AND DENOMINATION DEVICE HAVING A CLEAR IMAGE AND A BLURRED IMAGE

BACKGROUND OF THE INVENTION

The use of a metallized plastic strip embedded within currency paper as a security thread for counterfeit deterrence is described within U.S. Pat. Nos. 4,652,015 and 4,761,205. The security thread is virtually undetected under reflected light and legible under transmitted light to verify its presence. In commercial situations where verification of currency bills is required, the receiver of the currency bill must subject the currency to a relatively intense light source to read the security thread under transmitted light. With large queues of customers at a bank or supermarket, as well as in places of low level illumination such as bars and restaurants it is difficult to visually inspect the corresponding large number of currency bills. It would be advantageous therefore to have some means of automatically determining the presence of the requisite security thread and confirming authenticity to the teller or cashier.

U.S. Pat. No. 4,524,276 entitled "Apparatus for Detecting a Security Thread Embedded in a Paper-Like Material" describes an infrared radiation source- and two infrared radiation detectors used to determine whether or not a security thread is embedded in the paper-like material and also to determine what the detected security material is made of.

Countries outside of the United States that employ plastic or metal security threads embedded in their paper currency, require that the presence of such security threads be ascertained under transmitted light such as described in the aforementioned U.S. Pat. No. 4,524,276. In accordance with the United States requirement that the currency security thread be detected under transmitted light and not seen under reflected light, both reflective and transmissive determinations are made for complete verification of the currency.

U.S. Pat. No. 4,980,569 describes a security paper verification device wherein optical means are arranged on opposing surfaces of the currency to determine the absence of any device on the surface of the currency paper while detecting the presence of the device within the currency. This is to prevent attaching counterfeit security threads to the outside surface of the currency paper to replicate genuine currency.

U.S. Pat. No. 5,151,607 entitled "Currency Verification Device" describes the combination of optical means with inductive or capacitive sensors for verifying the presence of the security thread in currency paper.

U.S. Pat. No. 5,260,582 entitled "Security Paper Verification Device" describes optical, magnetic and capacitive sensors used in combination to determine currency authenticity. The dark inks and dyes used in printing U.S. federal reserve notes could provide difficult indication of a metallized security thread when such optical sensors are used, per se.

U.S. Pat. No. 5,260,582 entitled "Security Paper Verification Device" describes an optical array arranged on both sides of a currency-receiving slot to determine whether the requisite security thread is present within the paper or on either surface. The device includes a microprocessor for calibration of the optical arrays.

U.S. patent application Ser. No. 115,775 filed Sep. 3, 1993 entitled "Security Paper Verification Device" describes an optical array directed on one side of proffered currency paper to determine whether the requisite security thread is present within the paper or on the outer surface. The device includes a microprocessor for calibration of the optical arrays. When moving the currency by the photodiodes or laser diodes used within the optical scanners that "read" the currency indicia, or when moving the scanners by the stationary currency paper, some definition is lost in the focus of the photodiodes or laser diodes on the currency paper surface requiring that the scanners be moved at a uniform speed across the paper surface and within a predetermined plane to prevent blurring of the currency image.

It would be advantageous to more rapidly scan the currency indicia in the least amount of time without having to carefully control the focal distance between the scanners and the top surface of the currency paper.

Accordingly, one purpose of the invention is to describe an optical system and a correction algorithm that automatically compensates for image blurring caused by the motion of the scanners or the motion of the currency paper.

SUMMARY OF THE INVENTION

Currency verification and denomination is made by means of separate pairs of photodiodes or lasers arranged on opposite sides of paper currency to excite corresponding phototransistors arranged on both sides thereof to determine the presence of the embedded security thread and to recognize the currency denomination. One of the photodiodes is focused onto the top surface of the currency paper while the other photodiode is slightly out of focus to provide a successive pair of clear and "blurred" images. The successive images provide indication of distortion caused by the motion of the paper or the motion of the photodiodes. Corrective phase diversity algorithms in the logic circuit remove both the intentional and unintentional blurrings to provide a clear image of the paper surface. The "signature" of the currency paper produced by the collective images is compared to stored values within the logic circuit to determine the presence of a security thread or watermark and to recognize the currency denomination.

DESCRIPTION OF THE PREFERRED EMBODIMENT

Figure 1:
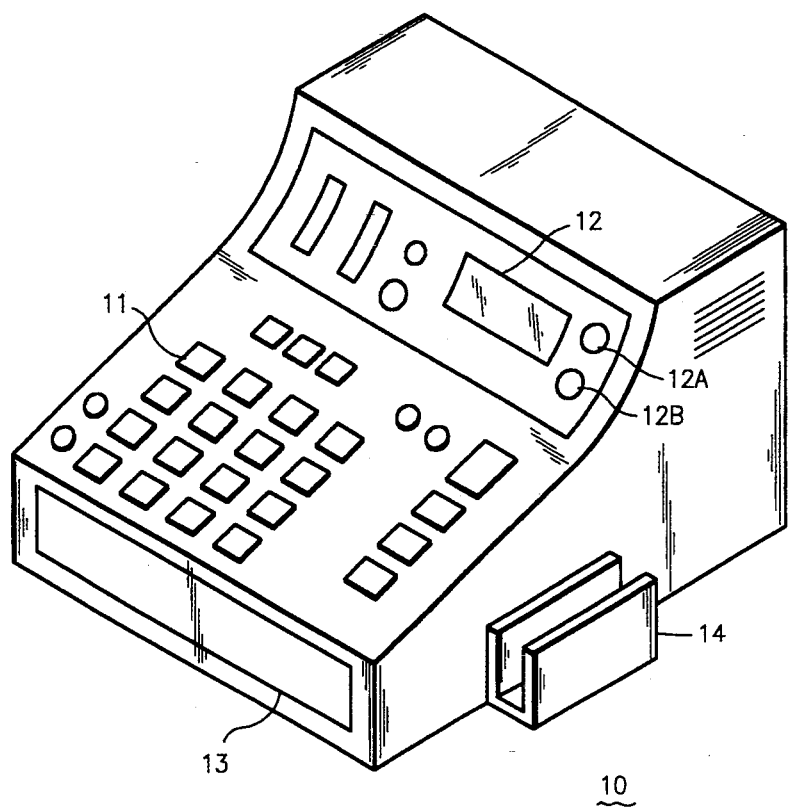
FIG. 1 is a top perspective view of a currency receiver employing the verification device according to the invention.

The verification device 14 according to the invention can be used with a cash receiver such as the cash register 10 shown in FIG. 1 with the verification device attached to the cash register next to the cash drawer 13. The device could be in the form of a currency receiver as described in aforementioned U.S. Pat. No. 4,980,569 or in the form of the optical scanners described within aforementioned U.S. Patent Application. If desired, the verification device could provide electromagnetic as well as electromechanical interlock with the cash register so that the cash receiver drawer would not open in the event that counterfeit currency is detected within the verification device. The cash register is of the type using a keypad 11 and a display 12 to depict the price of goods being purchased as well as the denomination of the cash proffered by the customer. The same display could automatically register the denomination of the genuine currency within the verification device or, a green light-emitting diode 12A could provide visual indication of genuine currency whereas a red light-emitting diode 12B could indicate the presence of counterfeit currency. The outputs of the verification device could be connected in feedback relation with the cash register control circuit to count the change from the cash drawer to speed up the transaction, if so desired.

Figure 2:
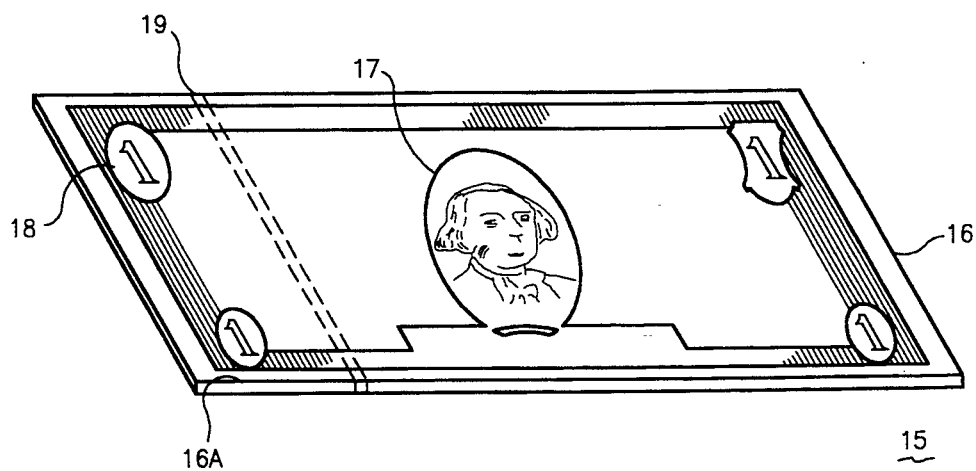
FIG. 2 is a top perspective view of a U.S. currency bill employing a selectively metallized security thread.

FIG. 2 depicts one type of United States currency 15 consisting of a paper bill 16 having the portrait 17 of a United States president or the like and including a security thread 19 embedded therein. The bill is selectively color-printed to enhance the various features printed on both sides of the bill except for a border 16A and currency denomination indicia 18 which retain the basically "white" color of the currency paper prior to printing. It is noted that the security thread extends transversely across the linear extent of the bill from the top to the bottom thereof. The security thread is introduced within the paper in the manner described within the aforementioned U.S. Pat. Nos. 4,652,015 and 4,761,205. The security thread is of the type consisting of a selectively metallized plastic film that is virtually invisible in reflected light and readily apparent under transmitted light. In order to verify the authenticity of such currency, a two-fold test must be performed, whereby the security thread must not be detected upon reflected light and, on the other hand, must be detected under transmitted light.

Figure 3:
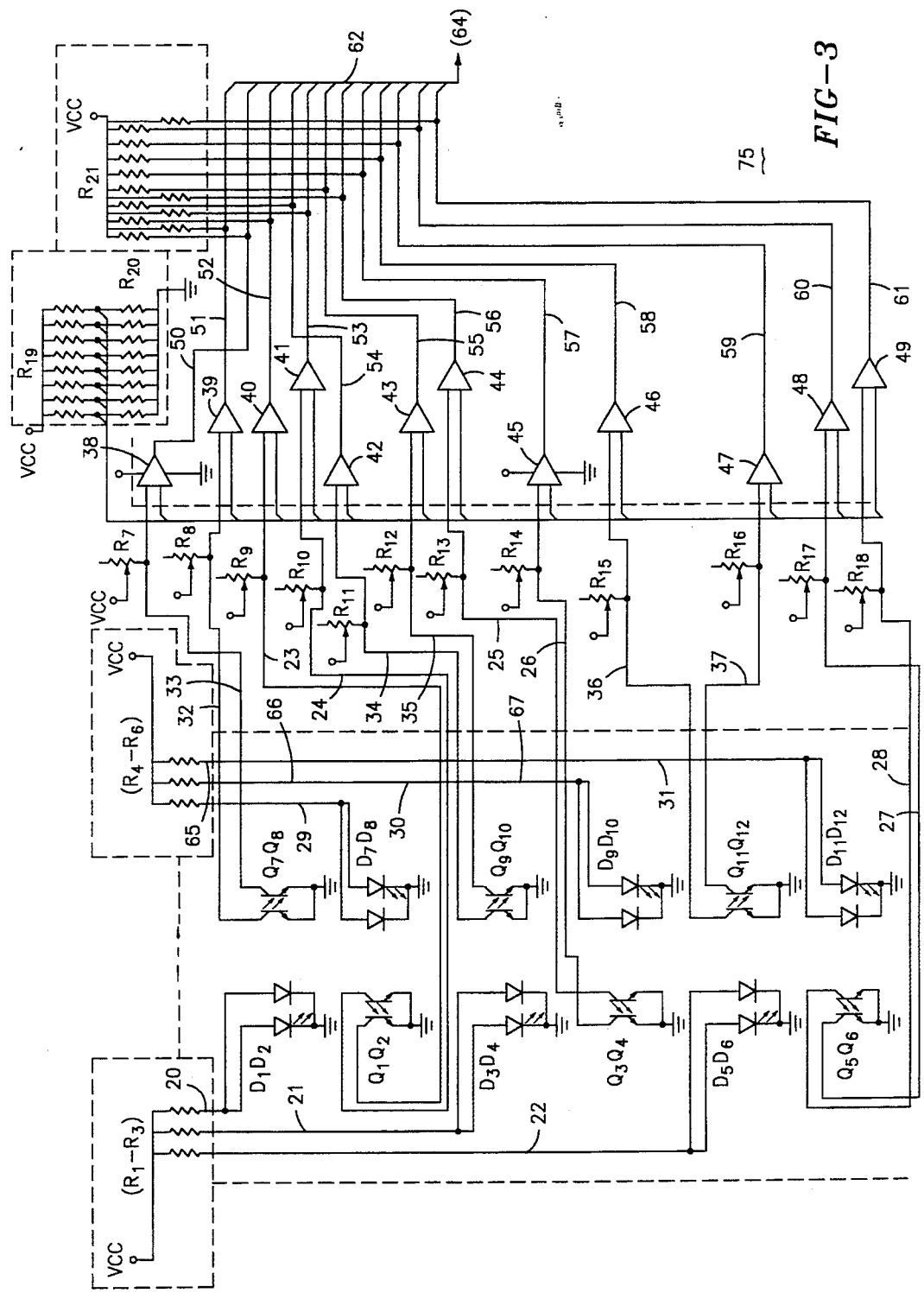
FIG. 3 is a schematic representation of the optical circuit used with the device of FIGURE 1.

As best shown in the optical circuit 75 of FIG. 3, three pairs of light emitting diodes or laser diodes D1,D2; D3,D4; D5,D6 are arranged along one side of the currency 15 to provide a reflected signal to corresponding phototransistors Q1,Q2; Q3,Q4; Q5,Q6. One diode in each pair is focused onto the top surface of the currency and the other diode in each pair is intentionally out of focus relative to the top surface by a predetermined aspect to provide intentional "blurring". Look-up tables are prepared for each currency denomination in accordance with the white paper, inks and dyes exhibited on the currency surface to provide the currency "signature" as described in the aforementioned U.S. Patent Applications. A file corresponding to the signatures is stored in look-up table format within the associated circuitry. Other signatures could also be generated for banknotes, travelers' checks and the like. A second algorithm is used to read the test file generated by the test image and to correlate the test image array with the reference array and identify which of the reference arrays matches the test array for denomination indication. A compensation algorithm provides filtering to discount data bits which may not correspond exactly to the stored data to compensate for fading effects as well as slight printing offsets. The intentional blurring is used to reduce the error incident in the focussed signals by means of the auto-correlation algorithm described within U.S. Pat. No. 4,309,602 entitled "Wavefront Sensing by Phase Retrieval". The application of phase retrieval adaptive optics to produce a clear image is further described in an article entitled "Phase Retrieval and Diversity in Adaptive Optics", published in the Optical Engineering Journal, September/October, 1982, hereinafter "phase diversity".

Bias for the diode pairs D1,D2; D3,D4; D5,D6 is provided from the voltage source Vcc through the conductors 20, 21, 22 and bias resistors R1–R3. The collectors of the phototransistor pairs Q1,Q2; Q3,Q4; Q5,Q6 are each connected by conductors 23-28 to one input of the each of the comparators 40,41; 44,45; 48,49 for comparison to the other input to which reference voltage is provided by one of the resistors within the resistor arrays R19, R20. The logic threshold outputs on the phototransistors are set by variable resistors R9,R10; R13,R14; R17,R18. The threshold at one of the inputs to comparators 40, 41 is such that when Q1 or Q2 turns off, R9 or R10 sets a logic 1 at the outputs of the respective comparator and pulls up the voltage to the input of the comparator. A logic 1 output from the comparator occurs when the voltage on the input is greater than the voltage set by the voltage divider consisting of resistors R19 and R20. Correspondingly, a logic 0 is output from the comparators when the voltage on the input is less than the voltage established by the voltage divider network. The logic threshold outputs on Q3,Q4 are set by variable resistors R13, R14 and the logic threshold outputs on Q5,Q6 are set by the variable resistors R17, R18. Q1–Q6 are collector-to-ground connected resulting in a zero output voltage when reflective light is received. The number of diodes and phototransistors can be increased for providing more data points and increased accuracy depending upon user requirements. The output bias on the comparators is set by the resistor array R21 and the output data on the corresponding conductors 52,53; 56,57; 60,61 is conducted by a multi-conductor cable 62 to the input ports of a Signetics 8031 microprocessor 63 connected within the control circuit 80 of FIG. 4.

In a similar manner, three pairs of light emitting diodes or laser diodes D7,D8; D9,D10; D11,D12 are arranged along the other side of the currency 10 to provide a reflected signal to corresponding phototransistors Q7,Q8; Q9,Q10; Q11,Q12. One diode in each pair is focused onto the top surface of the currency and the other diode in each pair is intentionally out of focus relative to the top surface in the manner described earlier. Bias for the diode pairs D7,D8; D9,D10; D11,D12 is provided from the voltage source Vcc through the conductors 29,30,31 and bias resistors R4–R6. The collectors of the phototransistor pairs Q7,Q8; Q9,Q10; Q11,Q12 are each connected by conductors 32,33; 34,35; 36,37 to one input of the comparators 38,39; 42,43; 46,47 for comparison to the other input to which reference voltage is provided by one of the resistors within the resistor arrays R19, R20. The logic threshold outputs on Q7,Q8 are set by variable resistors R7, R8. The threshold at one of the inputs to comparators 38,39 is such that when Q7 or Q8 turns off, R7 or R8 sets a logic 1 at the outputs of the respective comparator 38 or 39 and pulls up the voltage to the input of the comparator. A logic 1 output from the comparator occurs when the voltage on the input is greater than the voltage set by the voltage divider consisting of resistors R19 and R20. Correspondingly, a logic 0 is output from the comparators when the voltage on the input is less than the voltage established by the voltage divider network. The logic threshold outputs on Q9,Q10; Q11,Q12; are set by variable resistors R11,R12; R15,R16. The output bias on the comparators is set by the resistor array R21 and the data on the corresponding conductors 50,51;

54,55; 58,59 is conducted by the multi-conductor cable 62 to the input ports of the microprocessor 63 described earlier.

Figure 4:
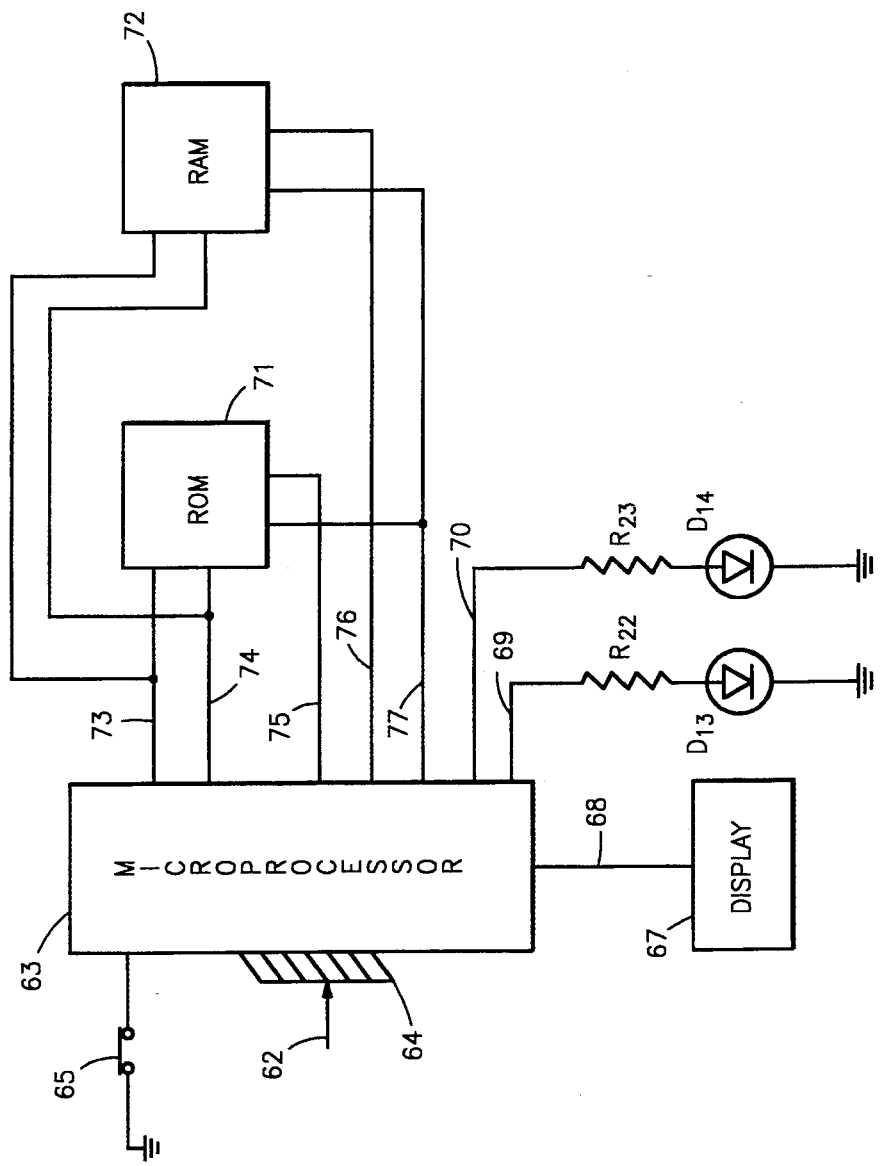
FIG. 4 is a schematic representation of the logic circuit used with the optical circuit of FIG. 3.

The microprocessor 63 operates within the logic circuit 80 of FIG. 4 in the manner described in the aforementioned U.S. patent application Ser. No. 871,196 entitled "Security Paper Verification Device." The input data over the cable 62 is provided to the I/O ports 64 and is read in the manner to be described below in some detail. After every reading, the microprocessor is cleared by means of the switch 65 and "pass" or "fail" information is outputted to the red and green light emitting diodes D13,D14 through conductors 78,79 and current limiting resistors R22,R23. Alphanumeric indication of currency denomination is provided by the display 76 connecting with the microprocessor over conductor 77. The real time data from the microprocessor is entered into the RAM 69 for comparison with the stored data contained within ROM 68 over the data bus 66. The address bus 67 addresses the ROM and RAM to make the comparisons with the stored denomination and verification data. The select conductor 72 interconnects the microprocessor with the ROM and the RAM and the enable conductors for the ROM and RAM are designated as 70,71.

As described within both of the referenced U.S. Patent Applications, U.S. currency "signatures" are obtained for genuine currency by obtaining optical data from the genuine currency and storing the optical data within the RAM in look-up table format and comparing the test data by means of a test algorithm stored in the ROM. Other signatures could also be generated for banknotes, travelers' checks and the like. The test algorithm is used to read the test file generated by the test image and to correlate the test image array with the reference array and identify which of the reference arrays matches the test array for denomination indication. The ROM contains the autocorrelation and compensation algorithms, also described earlier, to provide filtering to discount data bits which may not correspond exactly to the stored data to compensate for fading effects, printing offsets and the unintentional blurring caused by the motion of the photodiodes or the currency.

A simplified arrangement of the diode array can be achieved by placing each diode pair within a multi-focus scanner such as described within U.S. Pat. No. 5,210,398 whereby a single scanner can provide both the clear and blurred images simultaneously. A first pattern is developed corresponding to the focused images generated on the surface for each currency denomination and a second pattern is developed for the blurred images corresponding to the denominations. The information is correlated to provide a single sharply-focused image which is stored for later comparison with future test data.

To determine the presence or absence of the embedded security thread 19 (FIG. 2), corresponding pairs of the photodiodes D1-D12, and photransistors Q1-Q12 can be arranged on opposite sides of the paper for transmission through the paper in the manner described within the referenced U.S. Patent Applications. One of the diodes in each pair is similarly arranged to provide a clear image of the security thread to the corresponding detector on the other side of the paper while the other diode is intentionally out-of-focus on the security thread to provide a blurred image to the corresponding detector on the other side of the paper. The clear and blurred images are combined within the logic circuit to produce a resultant clear image which is then compared to stored values indicative of the security thread.

A simplified arrangement has herein been described for optical verification of security papers of the type containing security threads as well as watermarks which are not readily visible on the outer surface of the paper. Genuine currency is scanned to produce a signature corresponding to the location of a security thread as well as the currency denomination which is stored in memory. Subsequent scans are compared to the stored signature to determine both denomination as well as verification.

We claim:

1. Apparatus for authenticating and denominating currency paper, travelers checks, bank checks and the like comprising;
    a first pair of light emitters and light detectors arranged along one side of a proffered paper providing a first optical pattern corresponding to first indicia determined along said proffered paper, one of said first light emitters being focussed on a top surface of said paper to provide a clear image of said first indicia and another of said first light emitters being unfocussed on said top surface to provide a blurred image of said first indicia; and
    logic means connecting with said first detectors combining said clear and blurred images to produce a resultant image and comparing said first optical pattern to first stored values contained therein.

2. The apparatus of claim 1 including means providing indication as to whether or not said first optical pattern compares with said first stored values.

3. The apparatus of claim 1 wherein said first light emitters comprise optical diodes or lasers.

4. The apparatus of claim 1 wherein said first optical detectors comprise photo transistors.

5. The apparatus of claim 1 including a second pair of light emitters arranged along said one side of said proffered paper providing a second optical pattern corresponding to a security device embedded within said proffered paper, one of said second light emitters being focussed on said security device to provide a clear image of said security device and another of said second light emitters being unfocussed on said security device to provide a blurred image of said security device.

6. The apparatus of claim 1 including a second pair of light emitters and light detectors arranged along said one side of said proffered paper providing a second optical pattern corresponding to second indicia determined along said proffered paper, one of said second light emitters being focussed on said top surface of said paper to provide a clear image of said second indicia and another of said second light emitters being unfocussed on said top surface to provide a blurred image of said second indicia.

7. The apparatus of claim 4 including a second pair of light detectors arranged on an opposite side of said proferred paper, one of said second light detectors receiving said clear image of said security device and another of said second light detectors receiving said blurred image of said security device.

8. The apparatus of claim 5 wherein said logic means connects with said second light detectors combining said clear and blurred images of said security device to produce a resultant image of said security device and comparing said resultant image of said security device to stored values of said security device contained therein.

9. The apparatus of claim 1 wherein said first light emitters and light detectors comprise a first optical scanner.

10. The apparatus of claim 5 wherein said third light emitters and light detectors comprise a second optical scanner.

11. The-apparatus of claim 1 including a first pair of comparators connecting with said first light detectors providing first logic input to said logic circuit.

12. The apparatus of claim 5 including a second pair of comparators connecting with said second light detectors providing second logic input to said logic circuit.

13. The apparatus of claim 1 wherein said first indicia comprises denomination.

14. The apparatus of claim 5 wherein said security device comprises an embedded security fiber.

15. A method of denominating commercial paper and currency comprising the steps of:
    providing a paper having indicia of commercial value;
    arranging a pair of light emitters on one side of said paper, one of said light emitters providing a clear image of said indicia and another of said light emitters providing a blurred image thereof;
    arranging a pair of light detectors on said one side in optical communication with said light emitters;
    connecting said light detectors with a logic circuit containing stored data indicative of a plurality of values;
    combining said clear and blurred images to form a resultant image; and
    comparing said resultant image with said stored data for determining said commercial value.

16. A method of verifying commercial paper and currency comprising the steps of:
    providing a paper having an embedded security thread;
    arranging a pair of light emitters on one side of said paper, one of said light emitters providing a first clear image of said security thread and another of said light emitters providing a blurred image thereof;
    arranging a pair of light detectors on an opposite side of said paper in optical communication with said light emitters;
    connecting said light detectors with a logic circuit containing stored data indicative of said security thread;
    combining said clear and blurred images to form a resultant image; and
    comparing said resultant image with said stored data for determining presence or absence of said security thread.

17. The method of claim 14 including the steps of:
    arranging a second pair of light emitters on said one side of said paper, one of said second light emitters providing a second clear image of said indicia and another of said second light emitters providing a second blurred image thereof;
    arranging a second pair of light detectors on said one side of said paper in optical communication with said second light emitters;
    connecting said second light detectors with said logic circuit containing second stored data indicative of said indicia;
    combining said second clear and blurred images to form a second resultant image; and
    comparing said second resultant image with said second stored data for determining said commercial value.

18. The method of claim 15 comprising the steps of:
    arranging a second pair of light emitters on said one side of said paper, one of said second light emitters providing a second clear image of said security thread and another of said second light emitters providing a blurred image thereof;
    arranging a second pair of light detectors on said opposite side of said paper in optical communication with said second light emitters;
    connecting said second light detectors with said logic circuit containing second stored data indicative of said security thread;
    combining said second clear and blurred images to form a second resultant image; and
    comparing said second resultant image with said second stored data for determining presence or absence of said security thread.

* * * * *